United States Patent
Wager et al.

(10) Patent No.: US 9,215,057 B2
(45) Date of Patent: Dec. 15, 2015

(54) SUB-CARRIER ALLOCATION IN A WIRELESS COMMUNICATION SYSTEM

(75) Inventors: Stefan Wager, Espoo (FI); Christian Hoymann, Aachen (DE); Riikka Susitaival, Helsinki (FI); Vesa Virkki, Jorvas (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 105 days.

(21) Appl. No.: 14/128,138

(22) PCT Filed: Jun. 29, 2011

(86) PCT No.: PCT/SE2011/050868
§ 371 (c)(1),
(2), (4) Date: Dec. 20, 2013

(87) PCT Pub. No.: WO2013/002690
PCT Pub. Date: Jan. 3, 2013

(65) Prior Publication Data
US 2014/0133388 A1     May 15, 2014

(51) Int. Cl.
| | | |
|---|---|---|
| H04L 5/00 | (2006.01) | |
| H04B 7/14 | (2006.01) | |
| H04W 72/04 | (2009.01) | |
| H04W 84/04 | (2009.01) | |
| H04W 16/04 | (2009.01) | |

(52) U.S. Cl.
CPC ............. *H04L 5/0058* (2013.01); *H04B 7/14* (2013.01); *H04W 72/0446* (2013.01); *H04W 16/04* (2013.01); *H04W 84/047* (2013.01)

(58) Field of Classification Search
None
See application file for complete search history.

(56) References Cited

U.S. PATENT DOCUMENTS

| | | | | |
|---|---|---|---|---|
| 2008/0188231 | A1* | 8/2008 | Zhu et al. | 455/450 |
| 2012/0063298 | A1* | 3/2012 | Yi et al. | 370/216 |
| 2013/0039257 | A1* | 2/2013 | Chen | 370/315 |
| 2013/0044674 | A1* | 2/2013 | Teyeb et al. | 370/315 |
| 2013/0170428 | A1* | 7/2013 | Morioka et al. | 370/315 |
| 2013/0183971 | A1* | 7/2013 | Tamaki et al. | 455/436 |
| 2013/0344801 | A1* | 12/2013 | Redana et al. | 455/9 |
| 2014/0286157 | A1* | 9/2014 | Yi et al. | 370/227 |
| 2014/0307586 | A1* | 10/2014 | Zhang et al. | 370/254 |
| 2015/0071056 | A1* | 3/2015 | Yi et al. | 370/218 |
| 2015/0071227 | A1* | 3/2015 | Yi et al. | 370/329 |

OTHER PUBLICATIONS

International Search Report dated Feb. 9, 2012 for International Application No. PCT/SE2011/050868, International Filing Date Jun. 29, 2011 consisting of 3-pages.

(Continued)

*Primary Examiner* — Chirag Shah
*Assistant Examiner* — Suk Jin Kang
(74) *Attorney, Agent, or Firm* — Christopher & Weisberg, P.A.

(57) ABSTRACT

A radio base station, a relay node and a respective method therein are provided for communicating data to a user equipment, the relay node being associated with the base station, wherein a downlink transmission to the user equipment is scheduled on subframe(s) available for the base station. The method in the radio base station comprises detecting that at least a part of the available subframes are not needed for downlink transmission to the relay node; and un-reserving at least one of the not needed subframes. The method further comprises transmitting, to the relay node, a release notification message notifying the relay node of the unreserved subframes for enabling the relay node to use the unreserved subframes for downlink transmission.

16 Claims, 9 Drawing Sheets

(56) References Cited

OTHER PUBLICATIONS

Nokia Siemens Networks et al: "Un Subframe Configuration/Reconfiguration for In-band Relay", 3GPP Draft; R2-103068 (Un Subframe Configuration), 3rd Generation Partnership Project (3GPP), Mobile Competence Centre ; 650, Route Des Lucioles ; F-06921 Sophia-Antipolis Cedex ; France, vol. Ran WG2, No. Montreal, Canada; 20100510, May 4, 2010, XP050423237, [retrieved on May 4, 2010].

Huawei et al: "Clarifications on handling of SIBs in RNReconfiguration message", 3GPP Draft; R2-110340 Clarifications on Handling of SIBs in RNReconfiguration, 3RD Generation Partnership Project (3GPP), Mobile Competence Centre ; 650, Route Des Lucioles ; F-06921 Sophia-Antipolis Cedex ; France, vol. Ran WG2, No. Dublin, Ireland; 20110117, Jan. 10, 2011, XP050492796, [retrieved on Jan. 10, 2011].

* cited by examiner

SUB-CARRIER ALLOCATION IN A WIRELESS COMMUNICATION SYSTEM

TECHNICAL FIELD

Embodiments herein relate generally to sub-carrier allocation in a wireless communication system, and in particular to sub-carrier allocation with respect to a relay node being associated with a base station.

BACKGROUND

A wireless communication network typically comprises of a number of different cells. Each cell comprises a base station which has the coverage area of the cell. Different cells may have very different characteristics. Some cells are in cities, comprising buildings of different heights and other cells are in the countryside comprising open fields or trees or bushes. Some cells are relatively small and some cells are relatively large. Further, the number of users in each cell may vary dramatically depending on the type of cell and on the movement of users. Typically, some cells have "weak spots" where the radio coverage is poor. Certain cells have spots with a high concentration of users resulting in high demand on resources in the cell. In order to improve the radio coverage or to support a great number of users at a certain location, relay stations may be used. Relay stations provide increased radio coverage of a certain area within a cell, and/or increased capacity in the certain area within the cell.

An example of such a solution with a relay node to increase radio coverage or capacity is schematically illustrated in FIG. 1a. FIG. 1a illustrates a base station 100 having a coverage area illustrated by a dotted oval. Within the cell or at least overlapping with the cell is a relay node 140 having a smaller coverage area also illustrated by a smaller dotted oval. The relay node provides services to a user equipment 190 located within the cell, or coverage area, of the relay node 140.

Relaying support is added in the Release 10 (Rel-10) version of the third Generation Partnership Project (3GPP) LTE specification. The solution is a layer 3 relay, which means that all radio protocols (layers 1-3) are terminated in the relay node. User equipments connect to the relay node over standard Uu interface, meaning that backwards compatibility with Rel-8 UEs is achieved. From a user equipment perspective, the relay node looks like an ordinary eNodeB, eNB. The relay node has no fixed backhaul, but connects wirelessly to a donor cell using the Un interface. The donor cell is controlled by a Donor eNB (DeNB) and is based on Uu protocols, with some modifications. The DeNB also serves user equipments connected directly to it.

One challenge for relays is to overcome different interference issues. One type of interference is self-interference, where a transmitted signal from a relay node interferes with a received signal from the DeNB, see FIG. 1b. In FIG. 1b, it is illustrated that in case a relay station 140 transmits a signal to a user equipment 190 simultaneously as it receives a signal from the base station 100, the two signals interfere with each other. The result may be that data comprised in the signal received from the base station 100 in the relay node 140 will be so greatly interfered with that the data is lost for the relay node 140.

Two different types of relaying are defined; outband and inband relaying. With outband relaying, the Uu and Un operates on different frequencies allowing continuous transmission on both links without self-interference issues. With inband relaying, Uu and Un interfaces share on the same frequency, but time multiplexing is introduced to avoid self-interference issues.

Time multiplexing for inband relaying is achieved by coordinating the scheduling of Un and Uu interfaces so that they do not occur at the same time. The DeNB configures the relay node with a Un subframe configuration, which informs the relay node of which subframes that can be used for Un transmission and which can be used for Uu transmission. Correspondingly, the relay node configures its user equipments with a Rel-8 defined Multi-Media Broadcast over Single Frequency Network (MBSFN) configuration to ensure that user equipments do not expect reference symbols transmitted by the relay node on Un subframes.

In LTE, specific MBSFN subframes are introduced to enable multi-cast transmission to the UEs being configured to receive such a service. In Rel-8/9, the UEs that are not configured to receive multi-cast transmission, receive only Physical Downlink Control Channel (PDCCH) in the beginning of the MBSFN subframe. PDCCH can carry an uplink grant for a future subframe, for example. In LTE Rel-10, a new transmission mode, Mode 9, is introduced. In this transmission mode, the UEs can receive also on Physical Downlink Channel (PDSCH) in a MBSFN subframe.

Since the three first time slots of MBSFN subframes can be used to transmit PDCCH from RN to UEs, it will not be possible for the relay node to simultaneously receive PDCCH from DeNB without significant self-interference. Therefore, 3GPP has specified a new R-PDCCH in Rel-10, which is used to carry downlink scheduling assignments and uplink grants from the DeNB to the relay node. In the time domain, R-PDCCH transmission starts in symbol #3 to avoid time with PDCCH transmissions from the relay node in symbols #0, #1 and #2. The frequency domain of R-PDCCH is semi-statically configured via Radio Resource Control (RRC), so that the relay node knows in advance in which frequency domain the R-PDCCH will be transmitted.

The solution for achieving inband operation through Un configuration has some characteristics when it comes to the sharing the radio resources between the two links.

In particular, if it has to be guaranteed that no self-interference is caused from the Uu link to the Un link, then no transmission may take place on the Uu link if there is a possibility that there might be data on the Un link.

The Rel-8/9 MBSFN configuration defines different ratios of Un/Un resource split that can be supported. Out of the 10 subframes of a radio frame, subframes 1, 2, 3, 6, 7, 8 in FDD and subframes 2, 3, 4, 7, 8, 9 in TDD can be configured for MBSFN, see FIG. 7. This means that at most 60% of the resources can be assigned for Un transmission. When configuring 6 backhaul subframes, the Uu link can use 40% of the resources.

The above characteristics mean that the sharing of resources between Un and Uu follow a certain granularity and limitations. In case of temporal change in traffic load between the relay node and user equipments being served by the relay node, the relay node may not be able to support the increase in traffic load. This may lead to discarding of traffic resulting in users not being able to use their user equipments as desired. It may also cause loss of revenue to the operator of the wireless network.

SUMMARY

It is an object of the exemplifying embodiments to address at least some of the problems outlined above. In particular, it is an object of the exemplifying embodiments to provide a radio base station, a relay node and a respective method therein for communicating data to a user equipment, the relay node being associated with the base station, wherein a downlink transmission to the user equipment is scheduled on subframe(s) available for the base station. These objects and others may be obtained by providing a radio base station and a method therein and a relay node and a therein according to the independent claims attached below.

According to an aspect, a method in a radio base station connected to an associated relay node, for controlling the relay node with regards to subframes available for the radio base station for downlink transmission is provided. The method comprises detecting that at least a part of the available subframes are not needed for downlink transmission to the relay node; and un-reserving at least one of the not needed subframes. The method further comprises transmitting, to the relay node, a release notification message notifying the relay node of the unreserved subframes for enabling the relay node to use the unreserved subframes for downlink transmission.

According to an aspect, a method in a relay node, which relay node is connected to an associated radio base station controlling the relay node with regards to subframes available for the radio base station for downlink transmission is provided. The method comprises receiving, from the radio base station, a release notification message notifying the relay node of subframes being unreserved by the radio base station, and scheduling the unreserved subframes for transmission to at least one user equipment being served by the relay node.

According to an aspect, a radio base station connected to an associated relay node is provided. The radio base station is adapted to control the relay node with regards to subframes available for the radio base station for downlink transmission. The radio base station is adapted to detect that at least a part of the available subframes are not needed for downlink transmission to the relay node; and to un-reserve at least one of the not needed subframes. The radio base station is further adapted to transmit, to the relay node, a release notification notifying the relay node of the unreserved subframes for enabling the relay node to use the unreserved subframes for transmission.

According to an aspect, a relay node associated with a radio base station, which base station is adapted to control the relay node with regards to subframes available for the radio base station for downlink transmission is provided. The relay node is adapted to receive, from the radio base station, a release notification message from notifying the relay node of subframes being unreserved by the radio base station; and to schedule the unreserved subframes for downlink transmission to at least one user equipment being served by the relay node.

The radio base station and the method therein and the relay node and the method therein have several advantages. One advantage is that subframes which are available for the base station may be used by the relay node instead of remaining unused by the base station. This increases the use of the radio resources. Further it provides for dynamic sharing of the resources between the interface of the base station and the relay node; and the interface of the relay node and a user equipment. Still further, in case of an increase in traffic load between the relay node and a user equipment, the radio resources between the relay node and the user equipment may be temporarily increased in order to reduce the risk of the overloading the radio resources between the relay node and the user equipment.

BRIEF DESCRIPTION OF DRAWINGS

Embodiments will now be described in more detail in relation to the accompanying drawings, in which.

DETAILED DESCRIPTION

Briefly described, exemplifying embodiments of a method in a relay node, a method in a base station, a relay node and a base station are provided for communicating data to a user equipment. The communication of data is performed by the base station detecting that at least a part of available subframes are not needed for downlink transmission to the relay node, and releasing at least some of the available subframes so that the released subframes can be used by the relay node for downlink transmission to user equipments.

Typically, in communication networks comprising relay nodes, a first set of subframes are reserved for the base station and a second set of subframes are reserved for the relay node for downlink transmission. In this way, it is safeguarded that the base station and the relay node do not transmit in downlink on the same subframe(s), thereby reducing the risk for self-interference at the relay node.

By providing a relay node within a cell, and connecting the relay node to a base station, the base station will send data destined for a user equipment currently being served by the relay node, to the relay node, wherein the relay node will transmit the data to the user equipment.

Figure 1A:
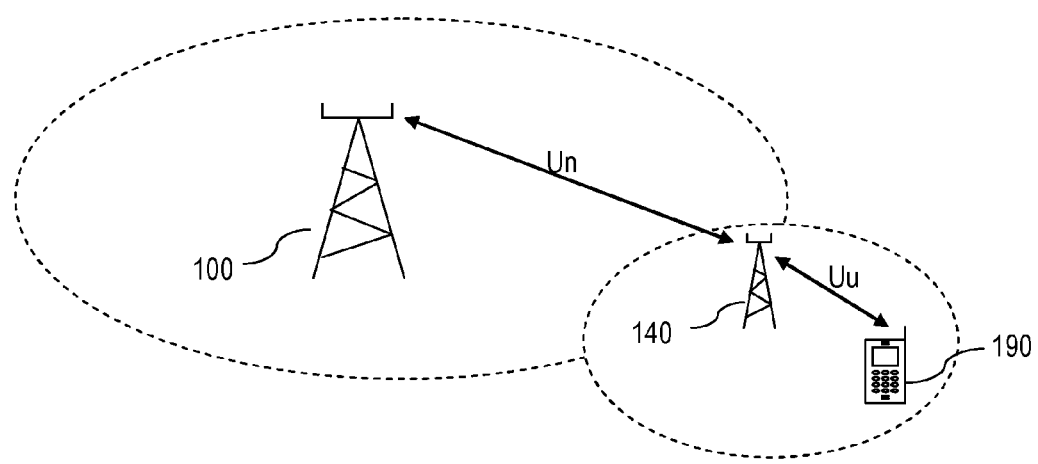
FIG. 1a is a schematic illustration of a wireless communication network comprising a relay node.
Figure 1B:
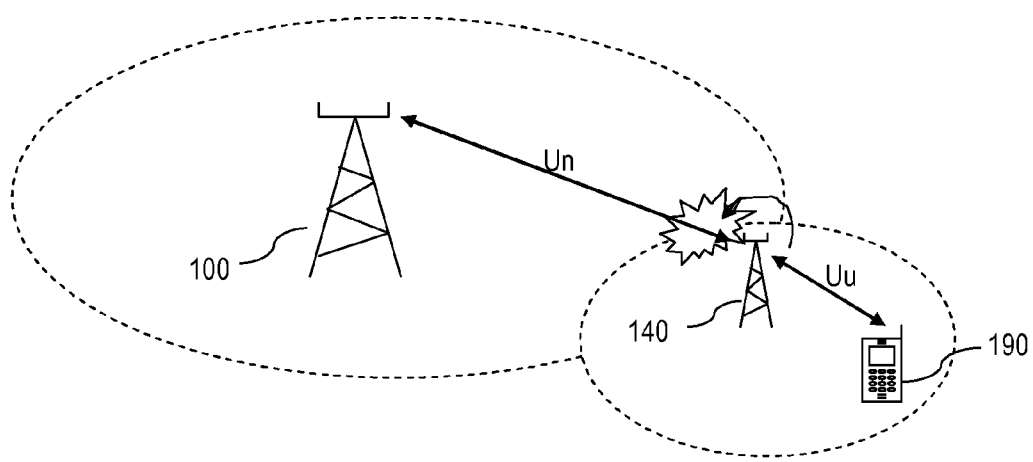
FIG. 1b is a schematic illustration of a wireless communication network comprising a relay node when a self interference occurs.
Figure 2:
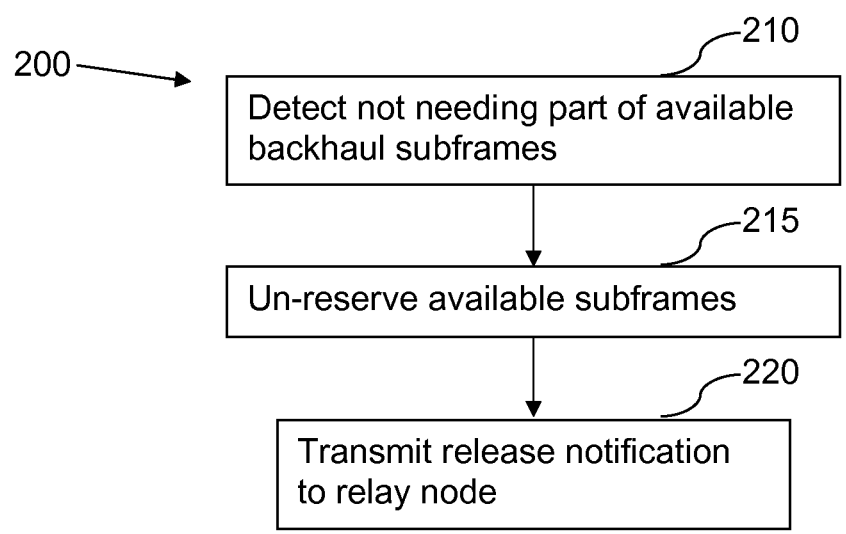
FIG. 2 is a flowchart of an exemplifying embodiment of a method in a radio base station for controlling a relay node.

An exemplifying embodiment of a method in a radio base station connected to an associated relay node, for controlling the relay node with regards to subframes available for the radio base station for downlink transmission will now be described with reference to the flowchart in FIG. 2. FIG. 2 illustrates the method 200 comprising detecting 210 that at least a part of the available subframes are not needed for downlink transmission to the relay node; and un-reserving 215 at least one of the not needed subframes. The method further comprises transmitting 220, to the relay node, a release notification message notifying the relay node of the unreserved subframes for enabling the relay node to use the unreserved subframes for downlink transmission.

By determining 210 that at least a part of the available subframes are not needed for downlink transmission to the relay node, the radio base station knows that some subframes available for the radio base station for downlink transmission will be unused. The subframes available for the radio base station may consequently not be used by the relay node in order to avoid self-interference. By un-reserving 215 the not needed subframes means that some, or all, of the not needed subframes are released by the radio base station and that the released subframes may be used by the relay node for downlink transmission to a user equipment. However, this must be communicated to the relay node such that the relay node becomes aware of the released subframes which are available for the relay node for downlink transmission. This is done by transmitting 220, 320, 420, to the relay node, a release notification message notifying the relay node of the unreserved or released subframes.

This exemplifying embodiment of a method in a base station has several advantages. One advantage is that subframes which are available for the base station may be used by the relay node instead of remaining unused by the base station. This increases the use of the radio resources. Further it provides for dynamic sharing of the resources between the interface of the base station and the relay node; and the interface of the relay node and a user equipment. Still further, in case of an increase in traffic load between the relay node and a user equipment, the radio resources between the relay node and the user equipment may be temporarily increased in order to reduce the risk of overloading the radio resources between the relay node and the user equipment.

According to an embodiment, the un-reserving the not needed subframes is performed with regards to a pre-configuration of backhaul subframes in which a first set of subframes is reserved for transmissions between the base station and the relay node; and a second set of subframes is reserved for transmissions between the relay node and user equipments being served by the relay node, thereby releasing subframes within the first set of subframes in a radio frame reserved for transmissions between the base station and the relay node.

Subframes available for the base station for downlink transmission can be said to be reserved for the base station, and likewise subframes available for the relay node for downlink transmission can be said to be reserved for the relay node.

Figure 3:
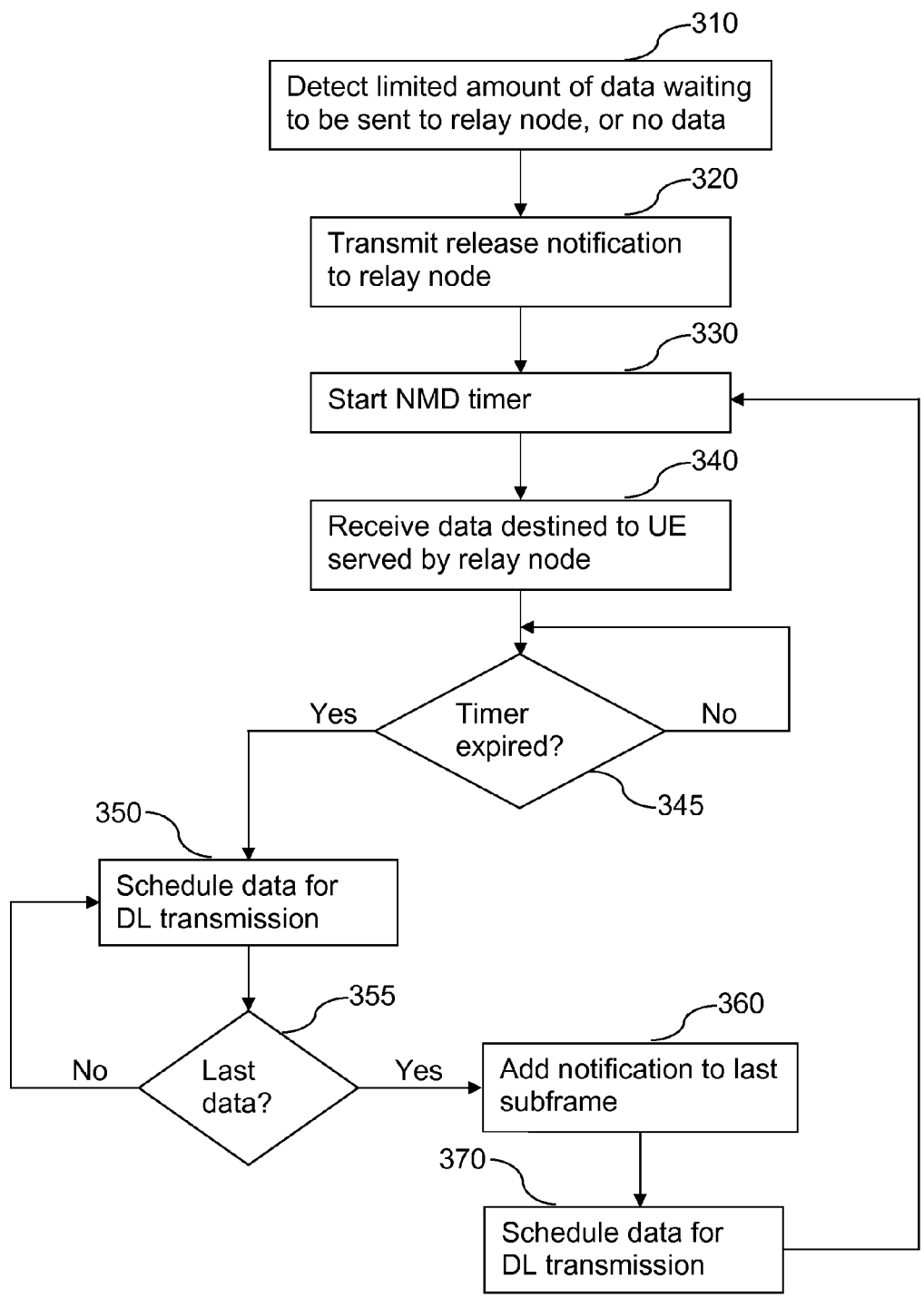
FIG. 3 is a flowchart of yet an exemplifying embodiment of a method in a radio base station for controlling a relay node.

Turning to FIG. 3, an exemplifying embodiment of the method 200 will be described.

According to this embodiment, the detecting 210 step comprises detecting 310 that a limited amount of data, or no data is waiting to be sent in downlink to the relay node.

The base station may or may not have data to transmit to the relay node. In other words, the base station may or may not have data to transmit to a user equipment currently being served by the relay node. By the radio base station detecting 310 that it has a limited amount of data, or no data is waiting to be sent in downlink to the relay node is meant either that the base station detects that it receives little or no data from a node in a communication network, in which the base station is comprised, destined for a user equipment currently being served by the relay node, or that that the base station detects that it has little or no data in a memory or buffer in the base station destined for a user equipment currently being served by the relay node. When this is detected by the radio base station, the method further comprises transmitting 220, 320, to the relay node, a release notification message notifying the relay node of the unreserved subframes for enabling the relay node to use the unreserved subframes for downlink transmission.

According to an embodiment, the method 200 further comprises starting 330 a No More Data, NMD, timer after transmitting the release notification message to the relay node. The method further comprises receiving 340 data, from a node in a communication network in which the base station is comprised, the data being destined to a user equipment being served by the relay node; and scheduling 350 the received data for downlink transmission to the relay node according to the pre-configuration of backhaul subframes, wherein subframes reserved for the base station are used.

When the radio base station transmits 320, to the relay node, a release notification message notifying the relay node of the unreserved subframes, i.e. released subframes, for enabling the relay node to use the released subframes for downlink transmission, the NMD timer is started. The NMD timer corresponds to a time interval for which the released subframes remain released. In other words, the released subframes will be available for the relay node for downlink transmission for the duration of the NMD timer.

In case data destined for a user equipment currently being served by the relay node is received 340 by the base station, the base station may not make use of the released subframes until the NMD timer expires, thereby ending the period in which the released subframes are released. The data is cached in the base station and when the NMD timer expires, the released subframes will again be available to the radio base station, and downlink transmission to the relay node according to the pre-configuration is scheduled 350. This is illustrated in FIG. 3 by step 345 wherein the base station may not schedule 350 data for downlink transmission to the relay node according to the pre-configuration of backhaul subframes until the NMD timer expires 345.

According to an embodiment, the method 200 further comprises adding 360 a notification to the last subframe of the received data indicating that certain subframes are unreserved subframes by the radio base station; and scheduling 370 the last subframe for downlink transmission to the relay node. The method further comprises starting 330 the NMD timer.

When the base station detects 355 that a remaining part of the received data, which was received from a node in the communication network in which the base station is used, can be sent in one subframe, i.e. the last subframe since there will be no more data left of the received data, the radio base station ads 360 a notification to the last subframe of the received data. The indication indicates, to the relay node, that certain subframes are unreserved subframes by the radio base station, in other words the notification corresponds to a release notification 220, 320 as described above. Since the NMD timer is started 330, the subframes are released, or un-reserved, for the duration of the NMD timer and they are available for the relay node for downlink transmission to user equipments.

Figure 4:
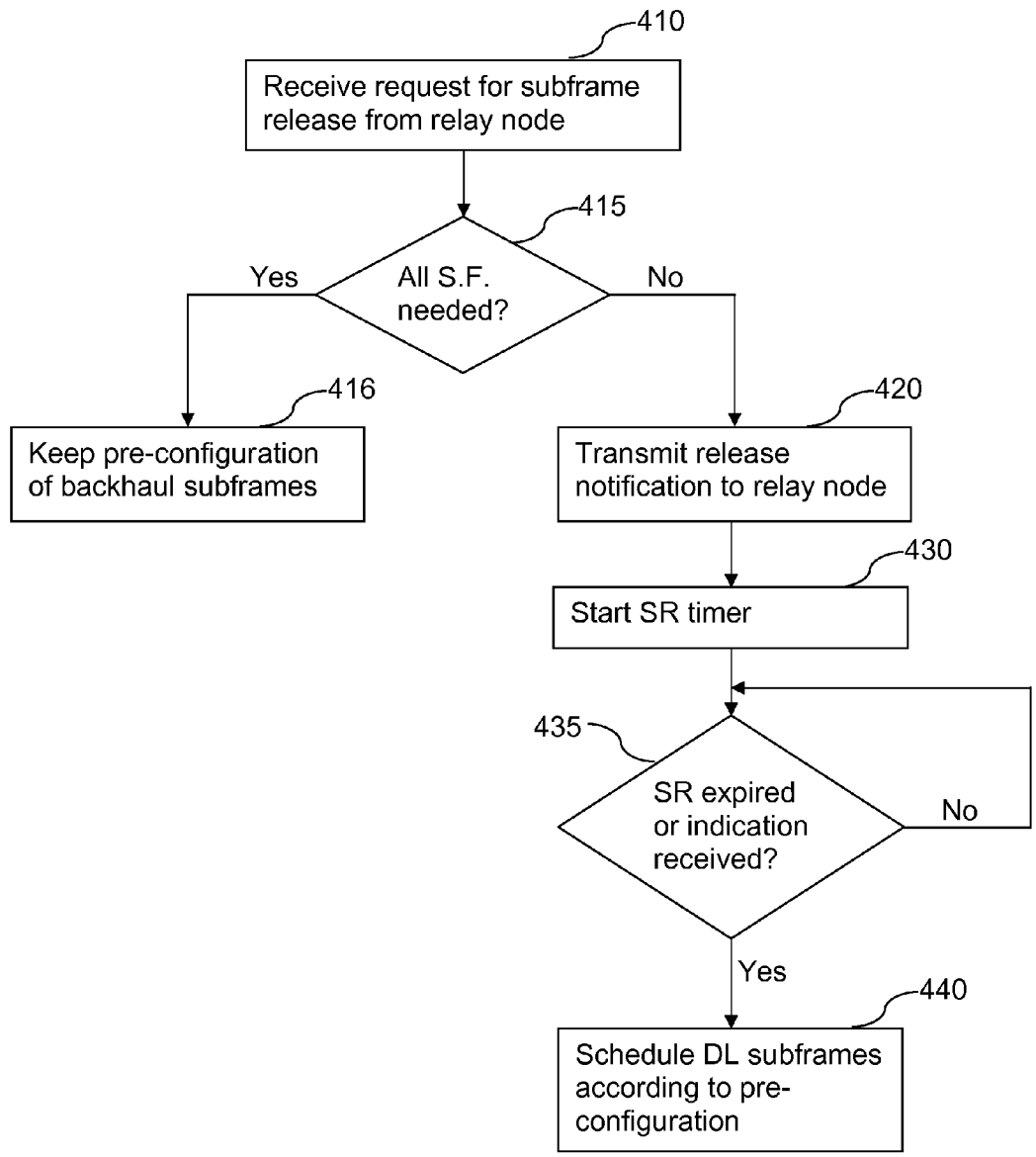
FIG. 4 is a flowchart of yet an exemplifying embodiment of a method in a radio base station for controlling a relay node.

Turning to FIG. 4, an exemplifying embodiment of the method 200 will be described.

According to this embodiment, the detecting 210 step comprises receiving 410 a request from the relay node for releasing subframes to be available for the relay node for downlink transmission.

One scenario when the radio resources between the relay node and the user equipment may need to be temporarily increased is data caching in the relay node. This means that frequently used data is cached in the relay node for fast access from user equipments currently being served by the relay node. In this case, the relay node may temporarily want to make use of all subframes, i.e. the subframes available for the relay node and all the subframes available for the base station, for transmissions to the user equipments. The data which is to be transmitted to the user equipments is already existing in the relay node's buffer or cache memory and hence need not be transmitted from the base station to the relay node. This also implies that the interface between the base station and the relay node is probably not used to its maximum capacity. In this scenario, the relay node requests release of subframes from the base station.

In an example, the radio base station receives 410 a request from the relay node for releasing subframes to be available for the relay node for downlink transmission. The method comprises the base station checking 415 whether at least a part of all available pre-configured subframes are not needed for transmitting data in downlink to the relay node. In case all the available pre-configured subframes are needed by the radio base station, it may deny the received request from the relay node and keep 416 the pre-configuration of subframes, i.e. the radio base station will not release any of the subframes available for the radio base station according to the pre-configuration. In case all the available pre-configured subframes are not needed by the radio base station, the radio base station un-reserves one, or more or all available subframes reserved for the base station; and transmits 420 a notification to the relay node indicating release of subframes to be available to the relay node for downlink transmission to a user equipment.

According to an embodiment, the method further comprises starting 430 a Subframe Release, SR, timer. When the SR timer expires 435 or when an indication is received 435 from the relay node indicating that it no longer requires release of pre-configured subframes, the method further comprises scheduling 440 downlink subframes according to the pre-configuration.

When the radio base station so to say grants the received 410 request from the relay node for releasing subframes to be available for the relay node for downlink transmission, the radio base station releases subframes for a predetermined time corresponding to the SR timer. This means that for the duration of the SR timer, the radio base station cannot schedule downlink transmissions on the released subframes; instead the released subframes are available to the relay node for downlink transmission to user equipment(s). When the SR timer expires 435, the released subframes becomes available to radio base station for downlink transmission. Alternatively, an indication is received 435 from the relay node indicating that it no longer requires release of pre-configured subframes. In such a case, the release of subframes is cancelled and the released subframes become available to radio base station for downlink transmission. As the released subframes become available to radio base station for downlink transmission, the radio base station may schedule 440 downlink transmissions to the relay node according to the pre-configuration. The SR timer is in an example implemented in both the radio base station and in the relay node, such that both the radio base station and the relay node will know the length of the time period for which subframes are released.

In an example, the release notification message releases all or specific pre-configured subframes and is valid for a predetermined time period or for an unlimited time period until a further notification is transmitted resuming the pre-configuration of subframes.

In case the radio base station has no data to transmit in downlink to the relay node, the radio base station does not need any subframes and may release all the subframes according to the pre-configuration to be available to the relay node for downlink transmissions to user equipments. In another scenario, the radio base station has only a relatively small amount of data to transmit in downlink to the relay node, such that the radio base station does not need all of the available subframes and may then release some of the subframes according to the pre-configuration of subframes. In the embodiments described above, the released subframes are released for a pre-defined time period, namely the duration of the NMD timer, the SD timer or the SR timer. In an alternative example, the method comprises releasing the subframes until a further notification is transmitted resuming the pre-configuration of subframes. This means that the subframes are released by the radio base station until the radio base station detects that it needs the released subframes and then transmits a further notification to the relay node indicating that the relay node is no longer permitted to use the released subframes. In yet an example, the release of the subframes is valid only for certain subframes or certain number of subframes.

In an example, the method 200 in a radio base station is performed in a radio base station used in a Long Term Evolution, LTE, communication system and wherein the backhaul subframes are sent to the relay node on a Un interface.

In yet an example, multiple LTE carriers are assigned a user equipment being served by the relay node in a carrier aggregation scheme comprising a primary component carrier, PCC, and at least one second component carrier, SCC, wherein the pre-configured subframes which will not be used by the base station for transmitting data in downlink to the relay node are associated with the SCC.

Carrier aggregation allows aggregating multiple LTE carriers (or cells). With carrier aggregation, the user equipment is connected/attached to a primary component carrier (PCC); the PCC can be seen as the serving cell. Then, one or more secondary component carrier(s) (SCC) can be configured. Control information related to the SCC, such as uplink grants or downlink assignments, can be transmitted on the SCC. Alternatively, the eNB can configure cross-carrier scheduling, where control information related to the SCC is transmitted on the PCC. In this example, the method is performed in the radio base station with regards to the pre-configuration of subframes for the SCC. The pre-configuration of subframes with regards to the PCC is kept intact.

Figure 5A:
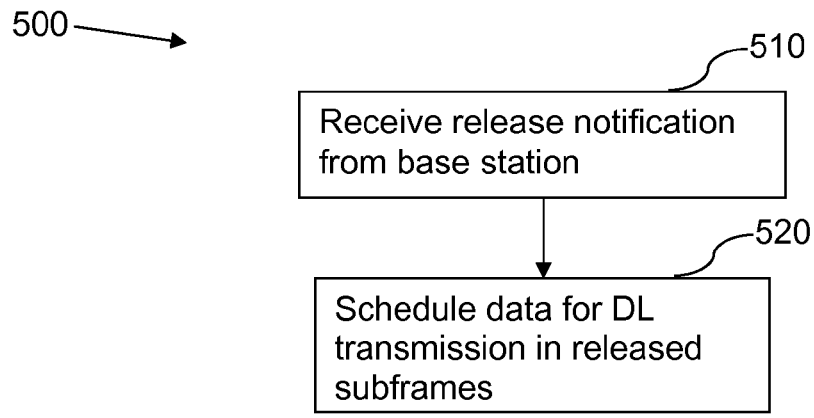
FIG. 5a is a flowchart of an exemplifying embodiment of a method in a relay node for controlling the relay node.
Figure 5B:
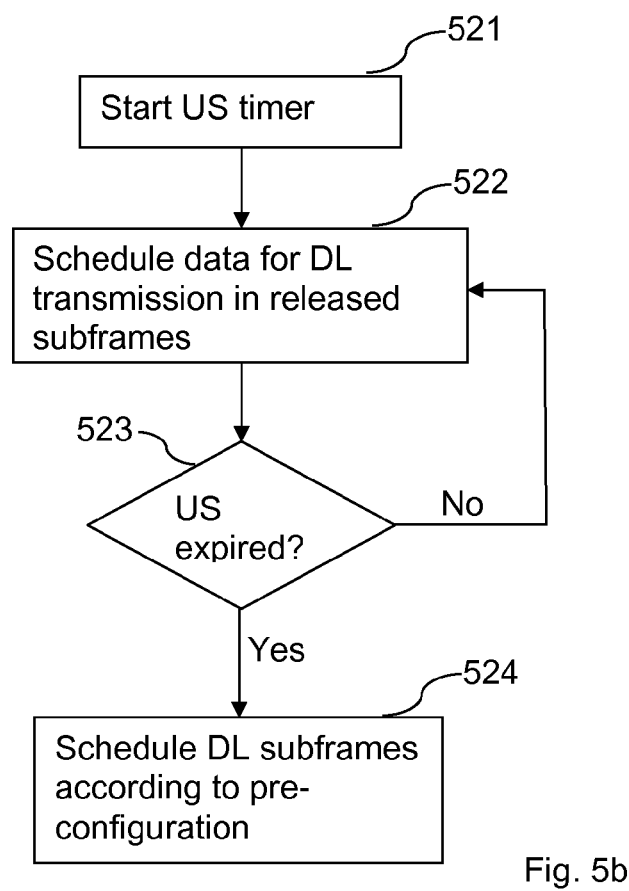
FIG. 5b is a flowchart of yet an exemplifying embodiment of a method in a relay node for controlling the relay node

Embodiments herein also relate to a method in a relay node connected to an associated radio base station controlling the relay node with regards to subframes available to the radio base station for downlink transmission. An exemplifying embodiment of such a method in a relay node will now be described with reference to the flowchart in FIG. 5. The method comprises receiving 510, from the radio base station, a release notification message notifying the relay node of subframes being unreserved by the radio base station, and scheduling 520 the unreserved subframes for transmission to at least one user equipment being served by relay node.

As was described above regarding the method in the radio base station, the radio base station detects 210 that at least a part of the available subframes are not needed for downlink transmission to the relay node; and un-reserves at least some of the not needed subframes. Then the radio base station transmits 220, 320, 420, to the relay node, a release notification message notifying the relay node of the unreserved subframes for enabling the relay node to use the unreserved subframes for downlink transmission. It is this release notification which is received 510 by the relay node. This means that the relay node is now allowed schedule 520 a downlink transmission to a user equipment, being served by the relay node, on the unreserved subframes.

This exemplifying embodiment of a method in a relay node has several advantages. One advantage is that subframes which are available for the base station may be used by the relay node instead of remaining unused by the base station. This increases the use of the radio resources. Further it provides for dynamic sharing of the resources between the interface of the base station and the relay node; and the interface of the relay node and a user equipment. Still further, in case of an increase in traffic load between the relay node and a user equipment, the radio resources between the relay node and the user equipment may be temporarily increased in order to reduce the risk of the overloading the radio resources between the relay node and the user equipment.

According to an embodiment, the un-reserved subframes relate to a pre-configuration of backhaul subframes in which a first set of subframes is reserved for transmissions between the base station and the relay node; and a second set of subframes is reserved for transmissions between the relay node and user equipments being served by the relay node, thereby releasing subframes within the first set of subframes in a radio frame reserved for transmissions between the base station and the relay node.

Subframes available for the base station for downlink transmission can be said to be reserved for the base station, and likewise subframes available for the relay node for downlink transmission can be said to be reserved for the relay node. By un-reserving a reserved subframe, the subframe is said to be released.

According to an embodiment, the scheduling 520 comprises starting 521 an Unrestricted Subframe, US, timer. When the US timer expires, the method comprises scheduling 524 a downlink transmission to the at least one user equipments according to the pre-configuration of backhaul subframes.

When the release notification message is received, the method comprises starting 521 the US timer. This US timer has the same value or duration as the NMD timer in the radio base station. Both these timers ensure that the base station and the relay node respectively know the duration under which the subframes are released by the base station. In the relay node, the US timer is started, and for as long as it has not expired, the relay node is free to schedule downlink transmissions using the released subframes. As soon as the US timer expires in the relay node, which is when the NMD timer expires in the radio base station, the released subframes are no longer released and must not be used by the relay node for downlink transmission to a user equipment being served by the relay node. Instead, when the US timer expires, the relay node may only schedule 524 a downlink transmission according to the pre-configuration, i.e. using the subframes which are available to the relay node according to the pre-configuration.

The length or duration of the US timer and the NMD timer are in an example configured by the communication network in which the base station and relay node are used. The configuration is in an example performed by means of RRC protocol. In another example, the length or duration of the NMD timer is indicated in an NMD indicator message triggering the start the timer. In yet an example, the length of the NMD timer and the US timer are of a fixed or standardised length.

Figure 6:
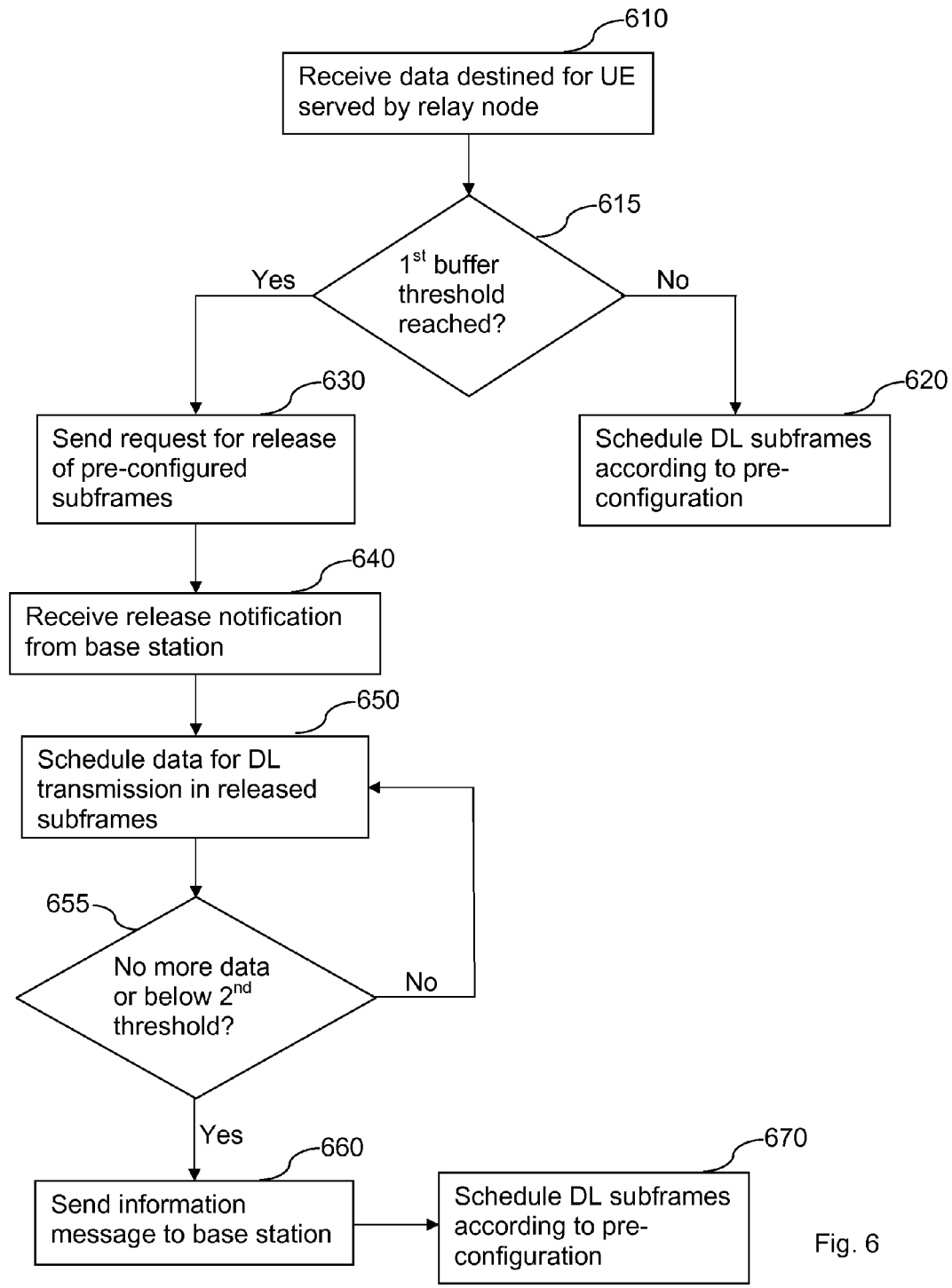
FIG. 6 is a flowchart of still an exemplifying embodiment of a method in a relay node for controlling the relay node.

FIG. 6 is a flowchart of yet an exemplifying embodiment of a method 500 in a relay node.

According to an embodiment, the method 500 further comprises receiving 610 data, from the base station, the data being destined for a user equipment being served by the relay node. The method further comprises checking 615 if a buffer level of the relay node is above a first buffer threshold level; and if so, the method comprises sending 630 a request to the radio base station requesting the base station to release subframes to be available for the relay node for downlink transmission.

The scenario when the radio resources between the relay node and the user equipment may need to be temporarily increased is data caching in the relay node. This means that frequently used data is cached in the relay node for fast access from user equipments currently being served by the relay node. In this case, the relay node may temporarily want make use of all subframes, i.e. the subframes available for the relay node and all the subframes available for the base station, for transmissions to the user equipments. The data which is to be transmitted to the user equipments is already existing in the relay node's buffer or cache memory and hence need not be transmitted from the base station to the relay node. This also implies that the interface between the base station and the relay node is probably not used to its maximum capacity. In this scenario, the relay node requests release of subframes from the base station.

In this exemplifying embodiment, the method comprises the relay node checking 615 if a buffer level of the relay node is above a first buffer threshold level. This may occur in the above described situation in which a buffer or cache memory comprising data, which is to be transmitted to the user equipments, wherein the amount of data in the buffer or cache memory exceeds a first buffer threshold level. This means that the relay node is in need of more radio resources than the available radio resources in order to transmit data to user equipments being served by the relay node. If this happens, the relay node sends 630 a request to the radio base station requesting the base station to release subframes to be available for the relay node for downlink transmission.

According to an embodiment, the method comprises determining 655 if there is no more data to be sent to the user equipment or if the buffer level is below a second buffer threshold level. If so, the method further comprises sending 660 an information message to the radio base station indicating that the relay node no longer requires release of subframes, and scheduling 670 downlink subframes according to the pre-configuration when the relay node has data to be transmitted to at least one user equipment.

After having sent 630 the request to the radio base station requesting the base station to release subframes to be available for the relay node for downlink transmission, the relay station receives 640 a release notification from the radio base station. The release notification indicates, to the relay node, subframes which have been released by the radio base station and which may consequently be used by the relay node for downlink transmission(s). The relay node then schedules 650 downlink transmission(s), and checks 655 if there is no more data to be sent to the user equipment or if the buffer level is below a second buffer threshold level. In case there is more data to send and the buffer level is not below a second buffer threshold level, the relay station continues scheduling downlink transmissions on the released subframes. In case there is no more data to be sent to the user equipment or if the buffer level is below a second buffer threshold level, the relay node is not in need of the released subframes and sends 660 an information message to the radio base station indicating that the relay node no longer requires release of subframes. Thereafter, the relay node resumes scheduling according to the pre-configuration and schedules 670 downlink subframes according to the pre-configuration when the relay node has data to be transmitted to at least one user equipment. It may be that there is no more data and then no downlink transmissions are scheduled. However, in case the reason for sending 660 the information message to the radio base station was that the buffer level was below a second buffer threshold level, then the relay node still has data to transmit to user equipment(s) and does so by scheduling 670 downlink subframes according to the pre-configuration.

In an example, the release notification message releases all or specific pre-configured subframes and is valid for a predetermined time period or for an unlimited time period until a further notification is transmitted resuming the pre-configuration of subframes.

In an example, the method 500 in a relay node is performed in a relay node used in a Long Term Evolution, LTE, communication system and wherein the backhaul subframes are sent to user equipments on a UU interface.

In yet an example, multiple LTE carriers are assigned a user equipment being served by the relay node in a carrier aggregation scheme comprising a primary component carrier, PCC, and at least one second component carrier, SCC, wherein the pre-configured subframes which will not be used by the base station for transmitting data in downlink to the relay node are associated with the SCC.

Figure 7:
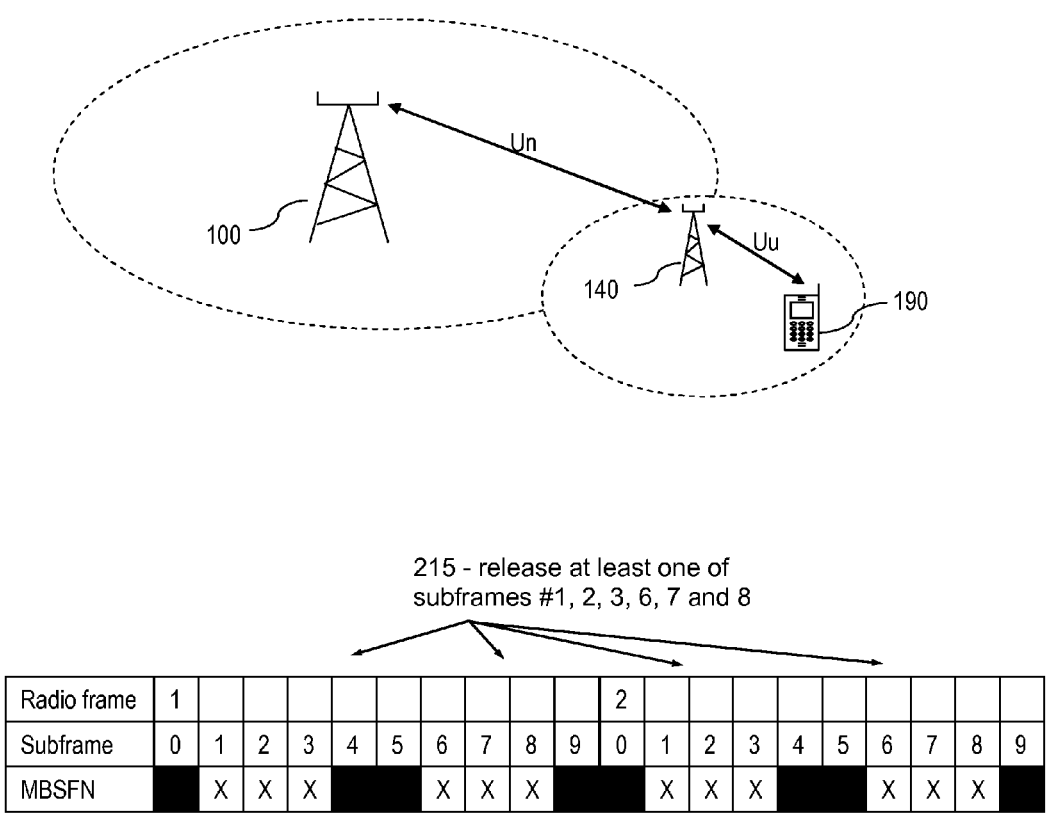
FIG. 7 is an illustration of an exemplifying subframe configuration.

FIG. 7 is an illustration of an exemplifying subframe configuration in an LTE communication system. The top part of the figure illustrates a base station 100 being connected to an associated relay node 140 and a user equipment 190 being served by the relay node 140. The bottom part of FIG. 7 illustrates an example of a configuration of subframes. In the example of LTE, the wireless communication between the base station 100 and the relay node 140 is performed on the Un interface; and the wireless communication between the relay node 140 and the user equipment 190 is performed on the Uu interface. Both the Un interface and the Uu interface comprise radio frames. In LTE there are two types of radio frames, type 1 and type 2. Type 1 is used in the LTE Frequency Division Duplex (FDD) mode systems and type 2 is used in the LTE Time Division Duplex (TDD) mode systems. A radio frame in LTE TDD mode system is typically 10 ms long and comprises 10 subframes. In the illustration of an exemplifying subframe configuration of FIG. 7, two consecutive radio frames are illustrates, radio frame 1 and 2. Each radio frame comprises ten subframes, i.e. subframe #0 to subframe #9. Subframes #0, 4, 5 and 9 are "black" in the figure illustrating that these subframes are configured to be reserved for, e.g. the relay node 140 for downlink transmission to user equipment 190. Subframes #1, 2, 3, 6, 7 and 8 are marked with an "X" in the figure illustrating that these subframes are configured to be reserved for, e.g. the base station 100 for downlink transmission to the relay node 140. With this exemplifying configuration, when the base station 100 un-reserves or releases subframes available for the base station to be used for the relay node for downlink transmission to the user equipment 190, the base station un-reserves or releases at least one of subframes #1, 2, 3, 6, 7 and 8. This means that the relay node may transmit in downlink to user equipment 190 on both the subframes being reserved for the relay node (0, 4, 5, 9) according to the configuration and on the subframe(s) being released or un-reserved by the base station 100.

Embodiments herein also relate to a radio base station connected to an associated relay node, the radio base station being adapted to control the relay node with regards to subframes available for the radio base station for downlink transmission. Such a radio base station will now be described with reference to FIG. 8a. The radio base station has the same advantages and objects as the method in a radio base station as described above. The radio base station will be described in brief in order to avoid unnecessary repetition.

Figure 8A:
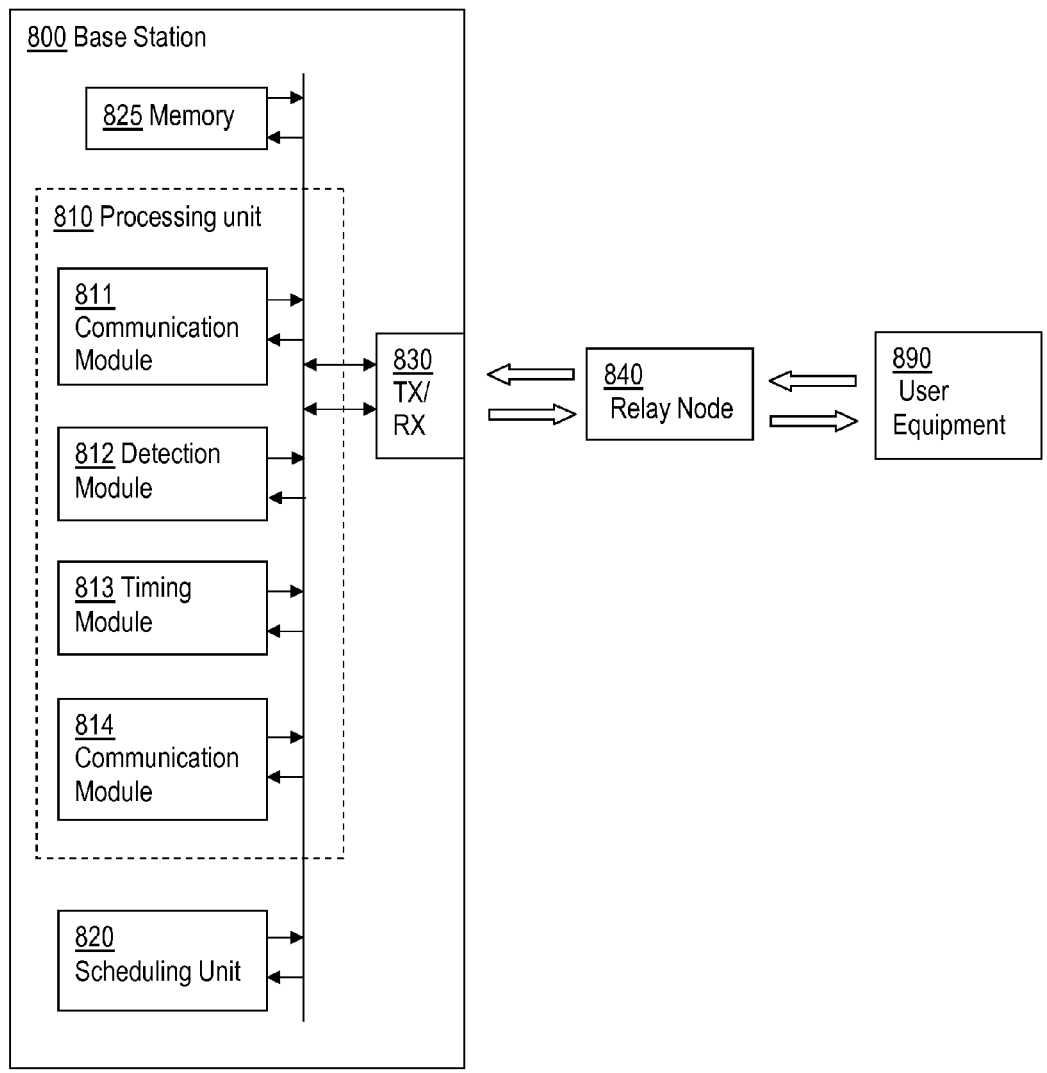
FIG. 8a is a block diagram schematically illustrating en exemplifying embodiment of a base station.

FIG. 8a illustrates a radio base station 800 connected to an associated relay node 840, adapted to control the relay node with regards to subframes available for the radio base station 800 for downlink transmission. The radio base station is adapted to detect that at least a part of the available subframes are not needed for downlink transmission to the relay node 840; and to un-reserve at least one of the not needed subframes. The radio base station is further adapted to transmit, to the relay node 840, a release notification notifying the relay node of the unreserved subframes for enabling the relay node to use the unreserved subframes for transmission.

According to an embodiment, the un-reserving the not needed subframes is performed with regards to a pre-configuration of backhaul subframes in which a first set of subframes is reserved for transmissions between the base station and the relay node; and a second set of subframes is reserved for transmissions between the relay node and user equipments being served by the relay node, thereby releasing subframes within the first set of subframes in a radio frame reserved for transmissions between the base station and the relay node.

According to still an embodiment, the detecting comprises detecting that a limited amount of data, or no data is waiting to be sent in downlink to the relay node 840.

According to yet an embodiment, the radio base station 800 is further adapted to start a No More Data, NMD, timer after transmitting the release notification to the relay node 840; and to receive data, from a node in a communication network in which the base station is comprised, the data being destined to a user equipment being 890 served by the relay node 840. The radio base station 800 is then adapted to, when the NMD timer expires, schedule the received data for downlink transmission to the relay node 840 according to the pre-configuration of backhaul subframes, wherein subframes reserved for the base station are used.

According to an embodiment, the radio base station 800 is further adapted to add a notification to a last subframe of the last received data to be transmitted to the relay node indicating release of pre-configured subframes reserved for the base station; schedule the last subframe for downlink transmission to the relay node 840, and to start the NMD timer.

According to still an embodiment, the detecting comprises the base station 800 being adapted to receive a request from the relay node 840 for releasing subframes to be available for the relay node 840 for downlink transmission.

In an example, the radio base station 800 is adapted to receive a request from the relay node for releasing subframes to be available for the relay node for downlink transmission. The method comprises the base station 800 checking whether at least a part of all available pre-configured subframes are not needed for transmitting data in downlink to the relay node. In case all the available pre-configured subframes are not needed by the radio base station, the radio base station is adapted to un-reserve one, or more or all available subframes reserved for the base station; and to transmit a notification to the relay node 840 indicating release of subframes to be available to the relay node 840 for downlink transmission to a user equipment.

According to yet an embodiment, the radio base station 800 is further adapted to start a Subframe Release, SR, timer. When the SR timer expires or when an indication is received from the relay node 840 indicating that the relay node no longer requires release of subframes, the radio base station is adapted to schedule the available downlink subframes for downlink transmission.

In an example, the release notification releases all or specific backhaul pre-configured subframes and is valid for a predetermined time period or for an unlimited time period until a further notification is transmitted resuming said pre-configuration of backhaul subframes.

In still an example, the base station 800 is used in a Long Term Evolution, LTE, communication system and wherein the backhaul subframes are sent to the relay node 840 on a Un interface.

In yet an example, multiple LTE carriers are assigned a user equipment being served by the relay node 840 in a carrier aggregation scheme comprising a primary component carrier, PCC, and at least one second component carrier, SCC, wherein the pre-configured subframes which will not be used by the base station 800 for transmitting data in downlink to the relay node 840 are associated with the SCC.

Embodiment herein also relate to a relay node 840 associated with a radio base station 800, which base station is adapted to control the relay node 840 with regards to subframes available for the radio base station for downlink transmission. Such a relay node will now be described with reference to FIG. 8*b*. The relay node has the same advantages and objects as the method in a relay node as described above. The relay node will be described in brief in order to avoid unnecessary repetition.

Figure 8B:
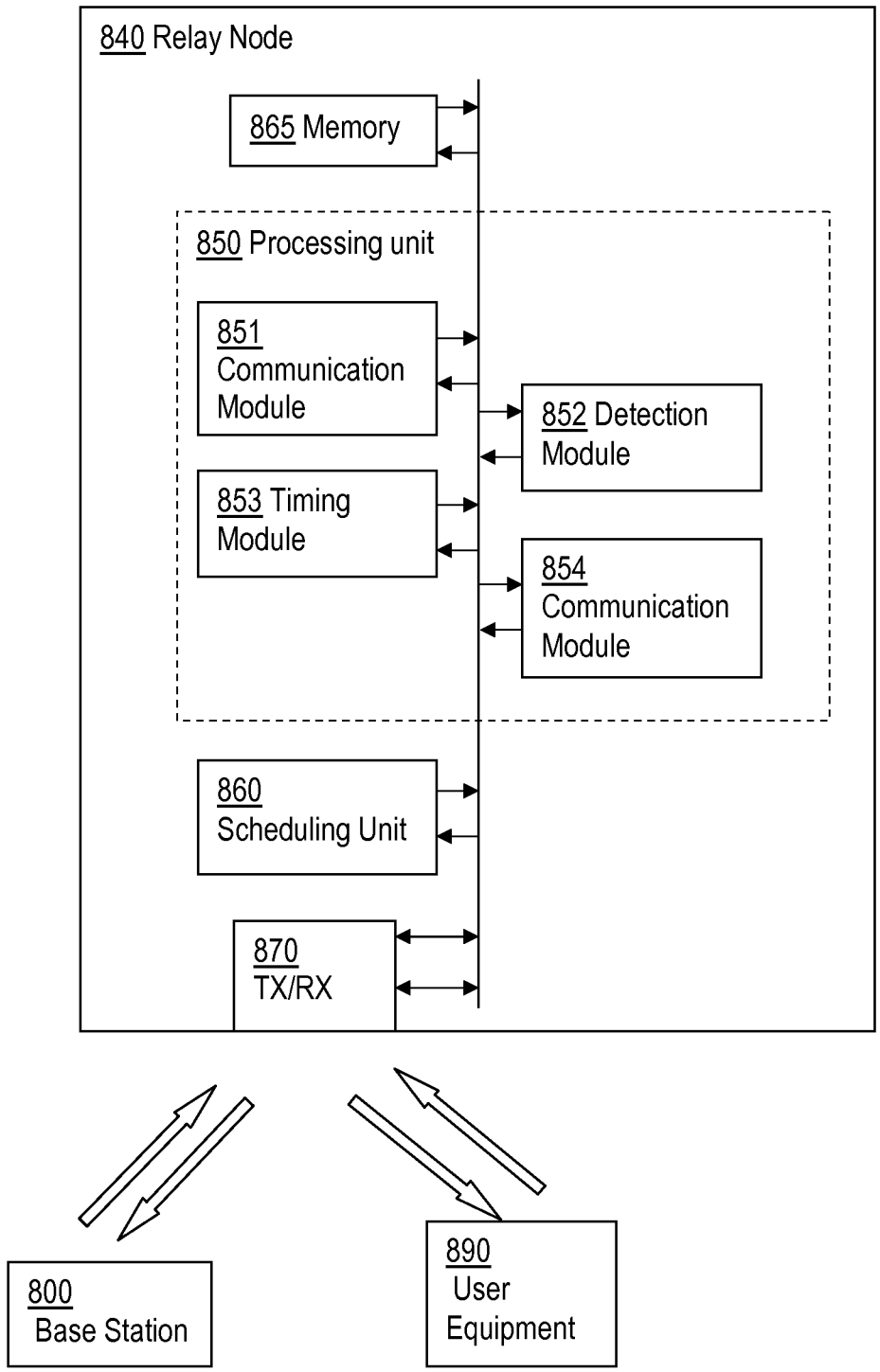
FIG. 8b is a block diagram schematically illustrating en exemplifying embodiment of a relay node.

FIG. 8*b* illustrates an exemplifying embodiment of a relay node 840 associated with a radio base station 800, which base station is adapted to control the relay node 840 with regards to subframes available for the radio base station 800 for downlink transmission. The relay node 840 is adapted to receive, from the radio base station 800, a release notification message notifying the relay node of subframes being unreserved by the radio base station; and to schedule the unreserved subframes for downlink transmission to at least one user equipment 890 being served by the relay node 840.

According to an embodiment, the un-reserved subframes relate to a pre-configuration of backhaul subframes in which a first set of subframes is reserved for transmissions between the base station 800 and the relay node 840; and a second set of subframes is reserved for transmissions between the relay node 840 and user equipments 890 being served by the relay node, thereby releasing subframes within the first set of subframes in a radio frame reserved for transmissions between the base station 800 and the relay node 840.

According to still an embodiment, the relay node 840 is further adapted to, after receiving the release notification message, start an Unrestricted Subframe, US, timer. When the US timer expires, the relay node 840 is adapted to schedule downlink transmission to the at least one user equipment 890 according to the pre-configuration of backhaul subframes.

According to yet an embodiment, the relay node 840 is further adapted to receive data, from the base station 800, the data being destined for a user equipment 890 being served by the relay node 840. The relay node 840 is further adapted to check if a buffer level of the relay node 840 is above a first buffer threshold level; and if so, to send a request to the radio base station 800 for releasing subframes to be available for the relay node 840 for downlink transmission.

According to an embodiment, the relay node 840 is further adapted to determine if there is no more data to be sent to the user equipment 890 or if the buffer level is below a second buffer threshold level; and if so, to send an information message to the radio base station 800 indicating that the relay node 840 no longer requires release of subframes.

In an example, the release notification releases all or specific backhaul pre-configured subframes and is valid for a predetermined time period or for an unlimited time period until a further notification is received ordering the resuming of the pre-configuration of backhaul subframes.

In yet an example, the relay node 840 is used in a Long Term Evolution, LTE, communication system and wherein the backhaul subframes from the base station 800 are received by the relay node 840 on a Un interface and wherein data is sent to user equipments 890 being served by the relay node 840 on a Uu interface.

In still an example, multiple LTE carriers are assigned a user equipment 890 being served by the relay node 840 in a carrier aggregation scheme comprising a primary component carrier, PCC, and at least one second component carrier, SCC, wherein the pre-configured subframes which will not be used by the base station 800 to transmit data in downlink to the relay node 840 are associated with the SCC.

With regard to uplink backhaul subframes in LTE, uplink backhaul subframes configured by the donor eNB 100, 800 are not used for Uu uplink transmissions in the relay node 140, 840 cell by not scheduling any user equipment 190, 890 (i.e. the relay node does not issue an uplink grant). Similar to the downlink, such subframes could in principle be used by the relay node for Uu if there is no backhaul traffic. However, a relay node does not know in advance if a certain uplink backhaul subframe is actually used for uplink backhaul transmission or not. Nevertheless and unlike the downlink, a relay node can issue an Uu uplink grant for a configured backhaul subframe speculating that there will not be any Un transmission. If it happens that there is no Un uplink grant for that particular subframe received from the donor eNB, the Uu transmission can be received; otherwise, the Uu collides with a Un transmission and the relay node has to decide which one to prioritize and which one to skip.

The signalling between the base station 100, 800 and the relay node 140, 840 employed to transmit the messages described above, e.g. the release notification message, is in an example realised by modification or re-interpretation on downlink control information (DCI) transmitted on PDCCH, a Media Access Control (MAC) Control Element (CE) in a MAC Packet Data Unit (PDU). In an example the messaging is realised by a standalone message, i.e. a message which is dedicated e.g. for the release notification message.

As has been described above, when the relay node has received the release notification message, the relay node is able to schedule downlink data for user equipments on the Uu interface, since the relay node knows that the radio base station, or DeNB, will not schedule Un traffic on the released subframes. In addition, the relay node may schedule upcoming uplink subframes as well, where a grant follows the normal offset from grant to Physical Uplink Shared Channel (PUSCH) transmission. This offset is 4 ms in FDD and varies in TDD. By the above described embodiments, the maximum Uu capacity can be increased up to 100% both for downlink and uplink during times of Un inactivity, i.e. during release of all subframes reserved for the radio base station, or DeNB, meaning that the radio base station will not execute any downlink transmission as long as it has released subframes reserved for the radio base station, or DeNB.

In an example, the radio base station, or DeNB, indication temporarily reduces the number of used backhaul subframes. In that case a timer-based approach (e.g., NMD and US timers) may be applied. However, it is not required since the relay node and the base station are continuously connected. Hence, in an alternative example, the base station sends a release-message and afterwards a reset-message on the remaining backhaul subframes to re-establish the original backhaul subframe configuration. It may also be possible for the base station to send a further release message that modifies/overwrites the released subframes of the previous release-message. In this manner, the base station is able to continuously indicate the actually used backhaul subframes without re-setting the original configuration in-between. In order to keep continuous connectivity, it is necessary that a minimum number of configured backhaul subframes is not released. In Rel.10 the minimum is 1 out of 10 subframes for TDD and 1 out of 8 for FDD.

The temporal reduction may be based on a "new" but temporary Un subframe configuration. In an example, this is achieved by signalling a bitmap (like in Rel.10 FDD) or by referring to an index of a specified configuration (like in Rel.10 TDD). Indicating a new configuration has the disadvantage that an uplink Un HARQ processes might have to be mapped to different backhaul subframes which might lead to data loss due to re-configuration. Alternatively the temporal reduction is based on a reduction of uplink Un HARQ processes and a temporary release of the corresponding downlink (for (R-) PDCCH with uplink grant) and downlink subframes (for PUSCH with user data).

It should be noted that FIGS. 8a and 8b merely illustrate various functional units and modules in the base station and the relay node respectively in a logical sense. The functions in practice may be implemented using any suitable software and hardware means/circuits etc. Thus, the embodiments are generally not limited to the shown structures of the base station and the relay node respectively and the functional units and the modules. Hence, the previously described exemplary embodiments may be realised in many ways. For example, one embodiment includes a computer-readable medium having instructions stored thereon that are executable by the respective processing units 810 and 850 for performing the method steps in the base station 800 and the relay node 840 respectively. The instructions executable by the computing system and stored on the computer-readable medium perform the method steps of the exemplifying embodiments as set forth in the claims.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method, in a radio base station connected to an associated relay node, for controlling the relay node with regards to subframes available for the radio base station for downlink transmission, the method comprising:
   detecting that at least a part of said available subframes are not needed for downlink transmission to the relay node, un-reserving at least one of said not needed subframes;
   transmitting, to the relay node, a release notification message notifying the relay node of the unreserved subframes for enabling the relay node to use the unreserved subframes for downlink transmission;
   said detecting comprises receiving a request from the relay node for releasing subframes to be available for the relay node for downlink transmission;
   starting a Subframe Release, SR, timer; and
   when one of said SR timer expires and an indication is received from said relay node indicating that the relay node no longer requires release of subframes, scheduling the available downlink subframes for downlink transmission.

2. The method according to claim 1, wherein said un-reserving the not needed subframes is performed with regards to a pre-configuration of backhaul subframes in which a first set of subframes is reserved for transmissions between the base station and the relay node, and a second set of subframes is reserved for transmissions between the relay node and user equipments being served by the relay node, thereby releasing subframes within the first set of subframes in a radio frame reserved for transmissions between the base station and the relay node.

3. The method according to claim 1, wherein said detecting comprises detecting that one of a limited amount of data and no data is waiting to be sent in downlink to said relay node.

4. The method according to claim 2, further comprises:
   starting a No More Data, NMD, timer after transmitting said release notification message to the relay node; and
   receiving data, from a node in a communication network in which the base station is comprised, the data being destined to a user equipment being served by the relay node, and when said NMD timer expires, scheduling said received data for downlink transmission to the relay node according to the pre-configuration of backhaul subframes, wherein subframes reserved for the base station are used.

5. The method according to claim 4, further comprising:
   adding a notification to the last subframe of the received data indicating that certain subframes are unreserved subframes by the radio base station;
   scheduling the last subframe for downlink transmission to said relay node; and
   starting said NMD timer.

6. A method in a relay node, the relay node being connected to an associated radio base station controlling said relay node with regards to subframes available for the radio base station for downlink transmission, the method comprising:
   receiving data, from the base station, the data being destined for a user equipment being served by the relay node;
   checking if a buffer level of the relay node is above a first buffer threshold level, and if so, sending a request to the radio base station requesting the base station to release subframes to be available for the relay node for downlink transmission;
   receiving, from the radio base station, a release notification message notifying the relay node of subframes being unreserved by the radio base station;
   scheduling the unreserved subframes for transmission to at least one user equipment being served by said relay node;
   determining one of if there is no more data to be sent to the user equipment and if said buffer level is below a second buffer threshold level, and if so sending an information message to the radio base station indicating that the relay node no longer requires release of subframes; and
   scheduling downlink subframes according to said pre-configuration when the relay node has data to be transmitted to at least one user equipment.

7. The method according to claim 6, wherein said unreserved subframes relate to a pre-configuration of backhaul subframes in which a first set of subframes is reserved for transmissions between the base station and the relay node, and a second set of subframes is reserved for transmissions between the relay node and user equipments being served by the relay node, thereby releasing subframes within the first set of subframes in a radio frame reserved for transmissions between the base station and the relay node.

8. The method according to claim 7, wherein said scheduling comprises:
   starting an Unrestricted Subframe, US, timer; and
   when said US timer expires, scheduling a downlink transmission to the at least one user equipments according to said pre-configuration of backhaul subframes.

9. A radio base station connected to an associated relay node and configured to control said relay node with regards to subframes available for the radio base station for downlink transmission, the radio base station comprising:
   a memory; and
   a processor in communication with the memory and being configured to:
   detect that at least a part of said available subframes are not needed for downlink transmitting to the relay node;

un-reserve at least one of said not needed subframes;
transmit, to the relay node, a release notification notifying the relay node of said unreserved subframes for enabling the relay node to use the unreserved subframes for transmission;
said detecting comprises the base station being configured to receive a request from the relay node for releasing subframes to be available for the relay node for downlink transmission;
start a Subframe Release, SR, timer; and
schedule the available downlink subframes for downlink transmission when one of said SR timer expires and an indication is received from the relay node indicating that the relay node no longer requires release of subframes.

10. The radio base station according to claim 9, wherein said un-reserving the not needed subframes is performed with regards to a pre-configuration of backhaul subframes in which a first set of subframes is reserved for transmissions between the base station and the relay node, and a second set of subframes is reserved for transmissions between the relay node and user equipments being served by the relay node, thereby releasing subframes within the first set of subframes in a radio frame reserved for transmissions between the base station and the relay node.

11. The radio base station according to claim 9, wherein said detecting comprises detecting that one of a limited amount of data and no data is waiting to be sent in downlink to the relay node.

12. The radio base station according to claim 10, further being configured to:
start a No More Data, NMD, timer after transmitting said release notification to the relay node;
receive data, from a node in a communication network in which the base station is comprised, the data being destined to a user equipment being served by the relay node; and
when said NMD timer expires: schedule said received data for downlink transmission to said relay node according to said pre-configuration of backhaul subframes, wherein subframes reserved for the base station are used.

13. The radio base station according to claim 12, further being configured to:
add a notification to a last subframe of last said received data to be transmitted to the relay node indicating release of pre-configured subframes reserved for the base station;
schedule said last subframe for downlink transmission to said relay node; and
start said NMD timer.

14. A relay node associated with a radio base station and configured to control said relay node with regard to subframes available for the radio base station for downlink transmission, the relay node comprising:
a memory; and
a processor in communication with the memory and being configured to:
receive data, from the base station, the data being destined for a user equipment being served by the relay node;
check if a buffer level of the relay node is above a first buffer threshold level, and if so, send a request to the radio base station for releasing subframes to be available for the relay node for downlink transmission;
receive, from the radio base station, a release notification message from notifying the relay node of subframes being unreserved by the radio base station;
schedule the unreserved subframes for downlink transmission to at least one user equipment being served by the relay node;
determine one of if there is no more data to be sent to the user equipment and if said buffer level is below a second buffer threshold level, and if so send an information message to the radio base station indicating that said relay node no longer requires release of subframes; and
schedule downlink subframes according to said pre-configuration when the relay node has data to be transmitted to at least one user equipment.

15. The relay node according to claim 14, wherein said un-reserved subframes relates to a pre-configuration of backhaul subframes in which a first set of subframes is reserved for transmissions between the base station and the relay node, and a second set of subframes is reserved for transmissions between the relay node and user equipments being served by the relay node, thereby releasing subframes within the first set of subframes in a radio frame reserved for transmissions between the base station and the relay node.

16. The relay node according to claim 15, further being configured to, after receiving said release notification message:
start an Unrestricted Subframe, US, timer; and
when said US timer expires, schedule downlink transmission to the at least one user equipment according to said pre-configuration of backhaul subframes.

* * * * *